United States Patent Office 3,142,658
Patented July 28, 1964

3,142,658
DIOLEFIN POLYMER RUBBER STABILIZED WITH BIS(DIALKYL HYDRAZONES)
Hugh W. Stewart, Woodbury, Conn., assignor to United States Rubber Company, New York, N.Y., a corporation of New Jersey
No Drawing. Filed Oct. 26, 1960, Ser. No. 64,982
5 Claims. (Cl. 260—45.9)

This invention relates to new protectants for ozone degradation of vulcanized rubber and certain plastic materials.

In U.S. Patent 2,658,046, issued November 3, 1953, Tracy M. Patrick discloses 2-thiophenealdehyde phenylhydrazone as a softener for a copolymer of butadiene and styrene. Furfural, benzaldehyde, and salicylaldehyde phenylhydrazones are described as chemical softeners for SBR by J. C. Ambelang, G. E. P. Smith, Jr., and G. W. Gottschalk, Ind. Eng. Chem., 40, 2186–92 (1948). The phenylhydrazones of other aldehydes and ketones are inert or have a stiffening action according to these authors.

The salt of a betaine hydrazone has been disclosed as an antioxidant for glycerides by S. Shappirio in U.S. Patent 2,430,031, issued November 11, 1947.

I have found that certain substituted hydrazones are antiozonants; some being essentially non-discoloring and non-staining. Many of these hydrazones may be used in petroleum hydrocarbons, vegetable and animal oils and fats and other air-oxidizable organic matter to inhibit oxidation.

These compounds may be represented by the following formulae,

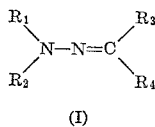

(I)

and

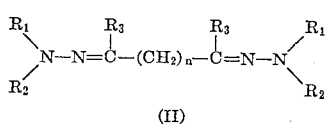

(II)

and

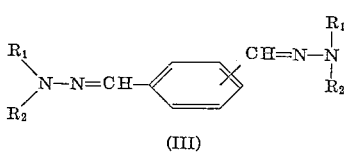

(III)

where $n$ is 0 to 8. The $R_1$ radical may be aralkyl, aryl, branched or normal, saturated or unsaturated alkyl, cycloalkyl, hydroxyalkyl, and alkoxyalkyl radicals, having from 1 to 18 carbon atoms. The $R_2$, $R_3$, and $R_4$ radicals may be the same as $R_1$ but not necessarily identical to $R_1$, except that $R_3$ and $R_4$ may be a hydrogen atom. $R_1$ and $R_2$ radicals together may be dimethylene, tetramethylene, pentamethylene, hexamethylene or oxydiethylene. In Formula III the group on the aromatic ring may be in either the o, m, or p position.

The rubber stock to which my inhibitors are added may be any vulcanizable rubber which is ordinarily subject to attack by ozone whether natural (Hevea) rubber, or a synthetic rubber, such as the rubbery homopolymers or copolymers of butadiene and similar aliphatic conjugated diolefin hydrocarbons, such as butadiene-styrene copolymer rubber, butadiene-acrylonitrile copolymer rubber, butadiene-vinylpyridine copolymer rubber, isobutylene-isoprene copolymer rubber, and the like. Natural rubber and synthetic rubbers of the foregoing type may be designated by the general term diolefin polymer rubbers. Generally, I employ about 1/10 to 5 parts by weight of the inhibitor per 100 parts of vulcanized diolefin polymer rubber.

The rubber stock may be compounded with any desired conventional vulcanizing agents, accelerators, softeners, fillers, etc. The compounded rubber stock containing my inhibitors may be shaped and vulcanized in any desired manner in accordance with conventional practice. Standard test methods reveal in a striking manner the remarkable improvement in ozone resistance imparted to the vulcanizate by the present chemicals.

A method for evaluating the protective ability of antiozone chemicals for inhibiting the ozone deterioration of SBR and other elastomeric materials has been developed by Delman, Simms and Allison, Analy. Chem., 26, 1589 (1954). It is referred to here as the Delman Viscosity Test. It utilizes the rate of change in viscosity of polymeric solutions during exposure to ozone a sa criterion for such evaluation. It provides a simple, rapid and reliable means for screening large numbers of chemicals for suitability as antiozonants without resorting initially to vulcanizate preparations which are sometimes complicated by compounding and processing variables. Two modifications were made by us, (a) ozonized air instead of ozonized oxygen was used and (b) the ozone concentration was 250 p.p.m. instead of 50 p.p.m. By actual tests the results with ozonized air were about the same as those with ozonized oxygen. The higher concentration of ozone gave a more accelerated test. The concentration of the test compound was 10% of the rubber polymer. The data given in Table I show the ozone protection given by these compounds. The greater the percentage retention of the initial relative viscosity the greater the ozone protection.

TABLE I

Delman Viscosity Test for Antiozone Chemicals

| Test Compound | Percent Relative Viscosity | | | | | |
|---|---|---|---|---|---|---|
| | 1 hr. | 2 hr. | 3 hr. | 4 hr. | 5 hr. | 6 hr. |
| Unprotected SBR | 32.7 | 15.2 | | | | |
| Formaldehyde dimethylhydrazone | 93.9 | 86.5 | 77.6 | 64.0 | 45.8 | 25.7 |
| Acetaldehyde dimethylhydrazone | 96.4 | 92.2 | 83.9 | 70.5 | 42.0 | 20.2 |
| Acetone dimethylhydrazone | 75.5 | 49.0 | 25.5 | 14.6 | | |
| n-Butyraldehyde dimethylhydrazone | 94.7 | 87.8 | 73.9 | 49.5 | 27.7 | 13.0 |
| Isobutyraldehyde dimethylhydrazone | 96.9 | 87.7 | 78.0 | 60.1 | 32.3 | 16.4 |
| 2-Butanone dimethylhydrazone | 43.1 | 21.6 | 12.3 | | | |
| Cyclohexanone dimethylhydrazone | 53.7 | 24.5 | 12.0 | | | |
| Benzaldehyde dimethylhydrazone | 94.1 | 84.2 | 76.4 | 63.1 | 40.9 | 21.7 |
| Furfural dimethylhydrazone | 88.2 | 74.4 | 55.4 | 33.9 | 18.0 | |
| n-Decanal dimethylhydrazone | 87.6 | 70.4 | 39.2 | 19.4 | 10.8 | |
| 2-Butanone oxydiethylenehydrazone | 42.7 | 22.1 | 14.7 | | | |
| n-Butyraldehyde tetramethylenehydrazone | 95.8 | 89.0 | 75.4 | 46.1 | 21.5 | 11.5 |
| n-Butyraldehyde pentamethylenehydrazone | 83.2 | 67.5 | 47.6 | 26.2 | 13.1 | |
| n-Butyraldehyde di-n-butylhydrazone | 91.8 | 78.1 | 56.1 | 31.6 | 14.3 | |
| Glyoxal bis(dimethylhydrazone) | 88.8 | 79.4 | 65.3 | 40.6 | 19.4 | |
| 2,4-Pentanedione bis(dimethylhydrazone) | 82.2 | 59.9 | 44.6 | 28.7 | 16.3 | |
| Glutaraldehyde bis(dimethylhydrazone) | 93.7 | 88.4 | 76.7 | 59.3 | 36.0 | 19.6 |
| Glyoxal bis(di-n-butylhydrazone) | 87.5 | 67.8 | 47.4 | 24.3 | 23.0 | 11.2 |
| Glutaraldehyde bis(di-n-butylhydrazone) | 87.4 | 74.8 | 66.9 | 38.4 | 18.5 | |
| Terephthalaldehyde bis(di-n-butylhydrazone) | 88.1 | 72.3 | 55.4 | 38.4 | 23.1 | |

Some of these compounds have been tested as antiozonants in sulfur vulcanized natural rubber white stock. The stocks were compounded according to the following formula:

| Component: | Parts by weight |
|---|---|
| Pale crepe | 100.00 |
| Zinc oxide | 10.00 |
| Lithopone | 60.00 |
| Snowflake whiting | 60.00 |
| Zinc salts of coconut oil acids | 0.50 |
| Sulfur | 3.00 |
| Tetramethylthiuram monosulfide | 0.15 |
| Test compound | 3.00 to 5.00 |

The stocks were cured for 30 min. at 274° F. For the static tests, 1" x 4" x 3/32" strips were formed into a 2" loop and exposed to 50 p.p.h.m. of ozone at 100° F. in the Mast ozone box and to outdoor weathering on a rack placed 45 degrees to the horizontal. For the dynamic tests, molded stocks 1" x 6" x 1/4" having a 1/8" round groove across center were split into 1/2" wide pieces, mounted outdoors and flexed through a 78 degree angle at about 8.5 kilocycles/hr. The results of these tests are shown in Tables II, III and IV, respectively. The degree of cracking was determined according to an arbitrary scale of measuring, using numerals 1, 2, 3 and 4 to represent cracks which were very fine, fine, medium and coarse (beyond practical use), respectively.

TABLE II

*Mast Ozone Box Test*

| Test Compound | Pts./100 R.H.C. | Hours to Degree of Cracking | | | |
|---|---|---|---|---|---|
| | | 1 | 2 | 3 | 4 |
| Blank | | 2 | 12 | 24 | 40 |
| Acetone dimethylhydrazone | 5 | 5 | 12 | 32 | 112 |
| Blank | | 2 | | | 36 |
| Glutaraldehyde bis(dimethylhydrazone) | 5 | | | 60 | 84 |
| Blank | | 3 | 5 | 7 | 11 |
| Decanal dimethylhydrazone | 3 | 5 | 7 | 11 | 16 |
| Blank | | | | 3 | 5 |
| Glutaraldehyde bis(di-n-butylhydrazone) | 3 | 3 | 5 | 12 | 34 |

TABLE III

*Outdoor Static Tests*

| Test Compound | Pts./100 R.H.C. | Hours to Degree of Cracking | | | |
|---|---|---|---|---|---|
| | | 1 | 2 | 3 | 4 |
| Blank | | | 11 | 35 | 53 |
| Benzaldehyde dimethylhydrazone | 5 | | 67 | | |
| Blank | | | | 26 | 41 |
| Glutaraldehyde bis(dimethylhydrazone) | 5 | 71 | 78 | 112 | |
| n-Butyraldehyde dimethylhydrazone | 5 | | 49 | 91 | 112 |
| n-Decanal dimethylhydrazone | 5 | 49 | 105 | | |
| Blank | | 6 | 13 | 22 | 41 |
| n-Butyraldehyde 1,1-tetramethylenehydrazone | 5 | 13 | 22 | 55 | 71 |
| Blank | | | | 5 | 6 |
| Decanal dimethylhydrazone | 3 | 12 | 22 | 29 | 70 |
| Blank | | | 6 | 8 | 12 |
| Glutaraldehyde bis(di-n-butylhydrazone) | 3 | | 51 | 65 | 84 |

TABLE IV

*Outdoor Dynamic Test*

| Test Compound | Pts./100 R.H.C. | Kilocycles to Degree of Cracking | | | |
|---|---|---|---|---|---|
| | | 1 | 2 | 3 | 4 |
| Blank | | | | | 663 |
| Benzaldehyde dimethylhydrazone | 5 | | | | 2,434 |
| Acetaldehyde dimethylhydrazone | 5 | | | | 2,434 |
| Acetone dimethylhydrazone | 5 | | | | 2,434 |
| Blank | | | | 1,158 | 2,261 |
| Glutaraldehyde bis(dimethylhydrazone) | 5 | | 1,158 | | 2,261 |
| n-Butyraldehyde dimethylhydrazone | 5 | 1,158 | | 2,261 | 4,241 |
| n-Decanal dimethylhydrazone | 5 | 1,158 | | | 2,261 |
| Blank | | | | | 440 |
| Furfural dimethylhydrazone | 5 | | | 440 | 1,320 |
| Isobutyraldehyde dimethylhydrazone | 5 | | | 440 | 1,320 |
| n-Butyraldehyde 1,1-tetramethylene hydrazone | 5 | | | 440 | 3,080 |
| n-Butyraldehyde 1,1-pentamethylenehydrazone | 5 | | | 440 | 1,320 |
| Blank | | | | 865 | 994 |
| Glutaraldehyde bis(di-n-butylhydrazone) | 3 | | 994 | 1,165 | 1,511 |

Some of these compounds are volatile and are partly lost from the rubber stock during cure and on standing. Their effectiveness as antiozonants in cured rubber, therefore, is substantially lessened. More of the less volatile compounds is retained in the rubber during milling and curing and, hence, such compounds are preferred from a practical standpoint.

The new compounds described in Examples 1–9 gave correct analyses for carbon, hydrogen, and nitrogen.

EXAMPLE 1.—TEREPHTHALALDEHYDE BIS(DI-n-BUTYLHYDRAZONE)

To a solution of 9.0 g. (0.07 mole) terephthalaldehyde in 50 ml. benzene was slowly added 22.0 g. (0.16 mole) 1,1 - di - n - butylhydrazine. The reaction mixture was heated to the refluxing temperature and the water produced was removed by azeotropic distillation. After removal of the benzene, the residue was crystallized from ethanol; M.P. 57–59° C.

EXAMPLE 2.—2-BUTANONE OXYDIETHYLENEHYDRAZONE

To 102.1 g. (1.0 mole) of oxydiethylenehydrazine was slowly added 86.5 g. (1.2 moles) of 2-butanone, maintaining the temperature below 40° C. with slight cooling. After 1 hr. the reaction mixture was heated to 50° C., and while hot, it was dried with KOH pellets. The resulting oil was distilled under reduced pressure; B.P. 64° C./4 mm., $n_D^{25}$ 1.4692, 88.5% yield.

EXAMPLE 3.—GLYOXAL BIS(DI-n-BUTYLHYDRAZONE)

To 57.8 g. (0.4 mole) of 1,1-di-n-butylhydrazine was slowly added 38.6 g. (11.6 g. real, 0.2 mole) of 30% aqueous glyoxal, keeping the temperature at 15–22° C. by cooling. Then the reaction mixture was heated at 80° C. for 1/2 hr. After cooling, 100 ml. of ether was added and the solution dried with KOH pellets. The ether was removed and the residue distilled under reduced pressure; B.P. 155–156° C./<1 mm., $n_D^{25}$ 1.5120, 67% yield.

EXAMPLE 4.—n-BUTYRALDEHYDE DIMETHYL HYDRAZONE

To 90.0 g. (1.5 moles) of 1,1-dimethylhydrazine was slowly added 108.0 g. (1.5 moles) of n-butyraldehyde, keeping the temperature below 20° C. by cooling. The product was dried with KOH pellets and distilled through a column 3/4" x 8" packed with 1/4" beryl saddles; B.P. 134–137° C./760 mm., $n_D^{25}$ 1.4385, 73.4% yield.

EXAMPLE 5.—2-BUTANONE DIMETHYLHYDRAZONE

To 144.2 g. (2.0 moles) of 2-butanone was slowly added 120.0 g. (2.0 moles) of 1,1-dimethylhydrazine keeping the temperature below 20° C. by cooling. The product was dried with KOH pellets and distilled as in Example 4; B.P. 115° C./760 mm., $n_D^{26.5}$ 1.4247, 77.8% yield.

EXAMPLE 6.—n-BUTYRALDEHYDE DI-n-BUTYLHYDRAZONE

This compound was prepared as in Example 4; B.P. 99–100° C./5 mm., $n_D^{25}$ 1.4489, 77.8% yield.

EXAMPLE 7.—n-BUTYRALDEHYDE TETRAMETHYLENEHYDRAZONE

This compound was prepared as in Example 5; B.P. 73–74° C./10 mm., $n_D^{25}$ 1.4772, 69% yield.

EXAMPLE 8.—n-BUTYRALDEHYDE PENTAMETHYLENEHYDRAZONE

This compound was prepared as in Example 5; B.P. 82–83° C./10 mm., $n_D^{25}$ 1.4779, 70% yield.

EXAMPLE 9.—GLUTARALDEHYDE BIS(DI-n-BUTYLHYDRAZONE)

To 41.2 g. (0.286 mole) of 1,1-di-n-butylhydrazine was slowly added 57.2 g. (14.3 g. real, 0.143 mole) of 25% aqueous glutaraldehyde, keeping the temperature at 15–20° C. by cooling. About 50 ml. of ether was added and the solution dried with KOH pellets. The ether was removed and the residue distilled under reduced pressure; B.P. 152–153° C./1 mm., $n_D^{25}$ 1.4742, 82% yield.

Having thus described my invention, what I claim and desire to protect by Letters Patent is:

1. A composition of matter comprising 100 parts by weight of diolefin polymer rubber and from 0.1 to 0.5 part of a hydrazone selected from the group consisting of,

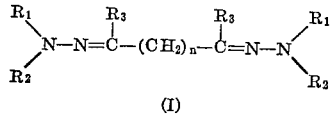

(I)

and

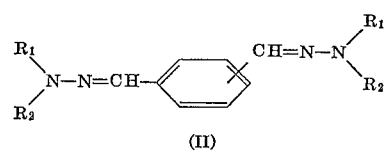

(II)

where $n$ is an integer from 0 to 8, $R_1$ to $R_3$ each representing a radical selected from the group consisting of aralkyl, aryl, straight, branched, and cyclized alkyl, alkenyl, hydroxyalkyl, and alkoxyalkyl radicals containing less than 19 carbon atoms, $R_3$ additionally representing a hydrogen atom, $R_1$ and $R_2$ together additionally representing a radical selected from the group consisting of dimethylene, tetramethylene, pentamethylene, hexamethylene, and oxydiethylene.

2. A composition of matter comprising 100 parts by weight of diolefin polymer rubber and from 0.1 to 5 parts by weight of glyoxal bis(di-n-butylhydrazone).

3. A composition of matter comprising 100 parts by weight of diolefin polymer rubber and from 0.1 to 5 parts by weight glutaraldehyde bis(di-n-butylhydrazone).

4. A composition of matter comprising 100 parts by weight of diolefin polymer rubber and from 0.1 to 5 parts by weight terephthalaldehyde bis(di-n-butylhydrazone).

5. A composition of matter comprising 100 parts by weight of diolefin polymer rubber and from 0.1 to 5 parts by weight glutaraldehyde bis(dimethylhydrazone).

References Cited in the file of this patent

UNITED STATES PATENTS

| 2,786,044 | Warner et al. | Mar. 19, 1957 |
| 2,875,053 | Minsk | Feb. 24, 1959 |

FOREIGN PATENTS

| 569,953 | Canada | Feb. 3, 1959 |

UNITED STATES PATENT OFFICE
CERTIFICATE OF CORRECTION

Patent No. 3,142,658  July 28, 1964

Hugh W. Stewart

It is hereby certified that error appears in the above numbered patent requiring correction and that the said Letters Patent should read as corrected below.

Column 5, lines 35 and 36, for "0.5 part" read -- 5.0 parts --.

Signed and sealed this 15th day of December 1964.

(SEAL)
Attest:

ERNEST W. SWIDER
Attesting Officer

EDWARD J. BRENNER
Commissioner of Patents